United States Patent [19]
Sverdlin

[11] Patent Number: 6,161,374
[45] Date of Patent: Dec. 19, 2000

[54] TRANSPORTATION PROPULSION SYSTEM

[76] Inventor: Anatoly Sverdlin, 2031 Walnut Green Dr., Houston, Tex. 77062

[21] Appl. No.: 09/431,743

[22] Filed: Nov. 1, 1999

[51] Int. Cl.$^7$ ..................................................... F02C 6/00
[52] U.S. Cl. ........................................ 60/39.15; 60/39.65
[58] Field of Search .................................. 60/39.15, 39.65

[56] References Cited

U.S. PATENT DOCUMENTS

| | | | |
|---|---|---|---|
| 2,930,190 | 3/1960 | Rogers | 60/38.18 |
| 3,308,618 | 3/1967 | Jubb | 60/39.15 |
| 3,591,313 | 7/1971 | Wunsch . | |
| 3,601,989 | 8/1971 | Austin . | |
| 3,808,804 | 5/1974 | Scott-Scott . | |
| 3,993,912 | 11/1976 | Ekstrom et al. . | |
| 4,123,200 | 10/1978 | Horler et al. . | |
| 4,274,811 | 6/1981 | Rao . | |
| 4,338,525 | 7/1982 | Kilgore . | |
| 4,602,478 | 7/1986 | Kelly . | |
| 4,719,746 | 1/1988 | Keller . | |
| 4,796,595 | 1/1989 | El-Nashar et al. . | |
| 5,267,432 | 12/1993 | Paxson . | |
| 5,297,384 | 3/1994 | Paxson . | |
| 5,553,448 | 9/1996 | Farrell et al. . | |

*Primary Examiner*—Timothy S. Thorpe
*Assistant Examiner*—Ehud Gartenberg
*Attorney, Agent, or Firm*—Browning Bushman

[57] ABSTRACT

A gas turbine engine (8) has a plurality of gas generators (28, 30, 32, 34) which generate and cool pressurized gas streams (38, 40) that are combined in a high efficiency topping cycle in a wave rotor convertor (36). The output of the wave rotor convertor (36) drives a single power turbine (24). Each gas generator may comprise an aircraft-type turbofan engine (28B, 30B). An electric generator (48) is selectively driven by each gas generator (28, 30, 32, 34).

11 Claims, 3 Drawing Sheets

TRANSPORTATION PROPULSION SYSTEM

FIELD OF THE INVENTION

The invention relates to propulsion systems for transportation vehicles, especially gas turbine powered marine propulsion units for large ocean going cargo vessels.

BACKGROUND OF THE INVENTION

Marine propulsion systems for large merchant vessels such as tankers and cargo ships are usually either of the diesel engine type, or of the gas turbine type. Over the years, much attention has been given to increasing the fuel efficiency of these marine propulsion systems, to the exclusion of the other fuel consuming power systems on the vessel.

Diesel engines have been made for marine propulsion which produce up to about 10,000–90,000 horsepower and which operate at thermal efficiencies up to 52% and higher. These engines typically have multiple, large diameter cylinders and operate at relatively low rotary speeds of 80 to 120 RPM. These engines can be connected to the vessel's propeller with a relatively simple power transmission system, and may even connect to the vessel's propeller without a mechanical gearbox.

The manufacturer of these diesel engines have spent considerable effort to make these engines operate at very high efficiencies. However, there is generally a very narrow set of operating parameters on these engines for peak efficiency. In order to minimize the fuel consumption of the vessel as it makes its voyage, the engine is designed such that it operates at its peak efficiency under normal sailing conditions. The engine's efficiency degrades rapidly as its operating conditions vary. For example, it would not be unusual for a diesel engine operating at 40% to 60% to rated power to have an efficiency of only 15% to 20%.

These large diesel engines also produce copious amounts of smoky exhaust, which has caused concern, especially at ports in cities with existing high levels of air pollution, such as Los Angeles and Houston. The problem has grown to the extent that some ports are beginning to limit the levels of smoke permitted, causing some shippers to reschedule delivery or divert to other ports. In spite of these problems, however, the diesel engine type marine propulsion systems are the prevalent propulsion plant for large merchant vessels.

Although used less frequently than diesel engines, gas turbine engines are also used as marine propulsion plants. These engines generally have two turbine sections; a gas generation turbine section and a power turbine section. The two sections are operatively coupled to form a gas turbine engine. More details on the design and control of gas turbine engines may be found in U.S. Pat. Nos. 3,601,989; 3,808,804; 3,993,912; 4,338,525; 4,602,478; and 5,553,448, all incorporated herein by reference. The power output turbine section of marine gas turbine engines usually operates at a fairly high RPM. A speed reduction transmission is generally required in merchant vessels with gas turbine engines to reduce output speed to the 80 to 120 RPM range. Gas turbine engines can be made to be very efficient, particularly when a topping cycle is implemented. Topping cycles are well known in the gas turbine industry, and are described or referred to in U.S. Pat. Nos. 3,591,313; 4,123,200; 4,274,811; 4,719,746; 4,796,595; 5,267,432; and 5,297,384, all incorporated herein by reference. A typical topping cycle utilizes a wave rotor convertor that operates as a result of a pressure wave process that takes place in the cells of the wave rotor convertor. The topping cycle wave rotor convertor increases the pressure ratio of the gas turbine, and consequently the overall cycle efficiency of the gas turbine engine.

Gas turbine engines are able to operate at about the same total high thermal efficiencies as diesel engines, in the 55% range. Unfortunately, similar to diesel propulsion engines, gas turbine propulsion engines are highly efficient in only a very narrow band of operating parameters. Gas turbine engines also suffer from the same dramatic degradation in efficiency when operated outside the optimal range. When the transmission requirements are factored in, the overall costs for typical marines gas turbine propulsion systems are generally similar to marine diesel engines.

The principal advantage of gas turbine engines is their ability to produce much more power than diesel engines, up to about 100,000–500,000 horsepower. Also, compared to diesel engines, gas turbine engines produce far less noxious exhaust emissions, and are much lighter in weight. For example, a 30,000 horsepower gas turbine propulsion plant weighs only about 60 tons. The very high horsepower to weight ratio makes gas turbine engines the engine of choice in naval vessels. Although some gas turbine engines are used in the merchant shipping industry, the use is not widespread.

Regardless of the propulsion system used, however, the merchant marine industry has a daunting task to manage the overall energy usage (i.e. fuel consumption) on the vessels. There are three distinct operating modes in merchant vessels that require energy management. The first is the voyage energy requirements, the second is the cargo operations energy requirements, and the third is the standby mode energy requirement. To date, manufacturers of marine propulsion systems have focused on the engine's efficiency during the voyage. However, due to energy requirements at partial loads in the vessel, if a more fuel-efficient engine replaces an old propulsion engine, it is possible for the overall energy efficiency of the vessel to decrease. When evaluating fuel efficiency, all operating modes of the vessel must be considered.

In order to effectively compete, merchant marine vessels must be able to transport many different types of cargo on the same ship at the same time. It would not be unusual, for example, to have one cargo requiring sub-zero refrigeration to be transported simultaneously with a cargo that required heating. Therefore, the energy requirements for providing the heating and/or cooling may vary considerably from trip to trip dependent on the kind of cargo.

During the voyage, some electric power may be generated directly from the propulsion engines or by steam turbine generators utilizing exhaust waste heat from the propulsion engines. Since the electrical power requirements may vary considerably from trip to trip, it is difficult to devise a propulsion engine driven generator that does not affect the engine's efficiency. In addition, during cargo loading and unloading, the propulsion engine is generally shutdown, and at these times additional electric power is often needed for cargo handling equipment from auxiliary electrical generators.

One way to address the varying electrical power demand is to install a number of small, inefficient auxiliary diesel engine powered electrical generator sets. The number of generators operating would vary according to electrical power usage. Since the electric power consumption may be considerable at times, the reduced efficiency of these generator sets can significantly increase operating costs. In addition, engine/generator maintenance and higher crew labor costs may also increase operating costs.

Another energy consumer, cargo heating, is relatively easy to perform during the voyage because waste heat from the propulsion engine exhaust is available to operate boilers for steam heat. However, during cargo operations, and during standby periods, the waste heat from the propulsion engine is not available. Still, the cargo's temperature must be maintained, and at times, additional heating of a cargo is required to unload it. To provide cargo and other heating when the propulsion engine is shutdown, a number of auxiliary steam boilers are utilized. As is well known, steam boilers are very inefficient, and the fuel costs to operate these boilers is significant.

There are numerous other energy consuming devices that are affected by the operating mode of the vessel. For example, compressed air is sometimes used in vast quantities during cargo handling operations. The problem in the marine shipping industry is that even though the propulsion engines can have high thermal efficiencies, when the total fuel consumption of a merchant vessel is evaluated, the overall thermal efficiency is much lower, effectively in the 20% to 30% range.

What is needed is a new more efficient means of providing efficient central power generation that will be highly efficient regardless of variations in the heating, electrical and propulsion requirements. The same power generation system would have the capability of providing propulsion power, electrical power, thermal energy, and other forms of power at high efficiency levels regardless of variations in the operating mode of the vessel, or in the various configurations of the vessel from trip to trip. In addition, it would be desirable to install the new power generation plant for marine vessels at costs lower than those presently available for marine power generation plants.

SUMMARY OF THE INVENTION

The present invention for a transportation or marine propulsion system utilizes a gas turbine engine. The gas turbine engine includes a plurality of independent gas turbines defining gas generators such as turbofan or jet engines. These engines provide both hot and cool pressurized gas fluids, which are combined in a novel manner in a high efficiency topping cycle in a wave rotor convertor. The output of the wave rotor convertor comprise high pressure gases from the gas generators at a temperature intermediate the temperatures of the hot and cool pressurized gas fluids. This intermediate temperature, high-pressure gas is then supplied at this intermediate temperature, and a higher pressure to a single, free power turbine. One or more of the gas generators may be equipped with an auxiliary electric power generator. The gas streams generated by the gas generators may be diverted for other purposes, such as a source of high temperature gas for heating a steam boiler.

The gas generators may be operated individually or in any combination. The number of gas generators in operation will vary according to the energy requirements. Because the hot and cool gas streams are combined in a topping cycle utilizing a wave rotor convertor, the two streams are converted to an intermediate temperature, high-pressure gas at very high thermal efficiencies. The relatively cool temperature of the high-pressure gas allows for a more reliable and less expensive power turbine than typically used in turbine engines.

The overall thermal efficiency of this new gas turbine engine can be maintained in the 55% range over a wide range of power outputs. As power consumption varies, the gas generators are started up or shutdown as necessary. Not only is this engine highly energy efficient, it is also very clean burning. The effect of mixing the hot and cool gasses at an intermediate temperature before they expand in the powerturbine not only reduce the amount of NOX in the exhaust stack, but the relatively cool exhaust is virtually smoke free.

Because of the high efficiency of the gas turbine engine, very high overall fuel efficiency is possible in merchant vessels in all of its operating modes.

It is an object of the present invention to provide a marine gas turbine engine which is energy efficient for all of the operating modes of the engine.

It is a further object of the invention to provide such a marine gas turbine engine having a plurality of gas generators which may be operated individually or in any combination.

An additional object is the provision of a wave rotor convertor for a marine gas turbine engine which receives hot and cool gas streams from each of the gas generators and converts the two steams to an intermediate temperature high pressure gas stream for driving the power turbine.

Other objects, features, and advantages of the invention will be apparent from the following specification and drawings.

BRIEF DESCRIPTION OF THE DRAWINGS

FIG. 1A is an operating schematic of a conventional prior art simple cycle gas turbine engine;

PRIOR ART—FIG. 1A

In order to understand the present invention, a brief, simplified explanation is provided for a prior art gas turbine engine 8A shown in FIG. 1A for a marine propulsion system. An intake 10A allows air to flow into the first stage 12A of a compressor section 13A of the gas generator 14A. The cool gas may pass through passaging 15A to a thermal recuperation heat exchanger 19A to preheat the gas before it is passed to a burner 16A. As the fuel, such as a diesel fuel, burns in burner 16A, the temperature and pressure of gas 18A in burner 16A increases. A portion of the hot, high pressure gas 18A impinges a second stage 20A of compressor section 13A of gas generator 14A which provides torque to turn the compressor section shaft 22A enabling the first stage 12A and the second stage 20A of the compressor section 13A to spin.

The hot high pressure gas 18A is then directed from the second stage 20A to impinge upon a power turbine 24A where it provides torque to turn the output shaft 26A of gas turbine engine 8A. The exhaust gas may be passed through further passaging 25A from the power turbine 24A through a thermal recuperation heat exchanger 19A and finally to an exhaust stack 27A.

Depending upon the power turbine 24A design, power turbine 24A may rotate at a relatively low speed with a relatively high torque, or it may rotate at a relatively high speed when mounted in a marine propulsion system. In an actual engine, many additional devices and controls may be added to this simplified prior art gas turbine engine as gas generators to increase operating efficiency and control the power output.

DESCRIPTION OF THE INVENTION AND PREFERRED EMBODIMENT

Figure 1:
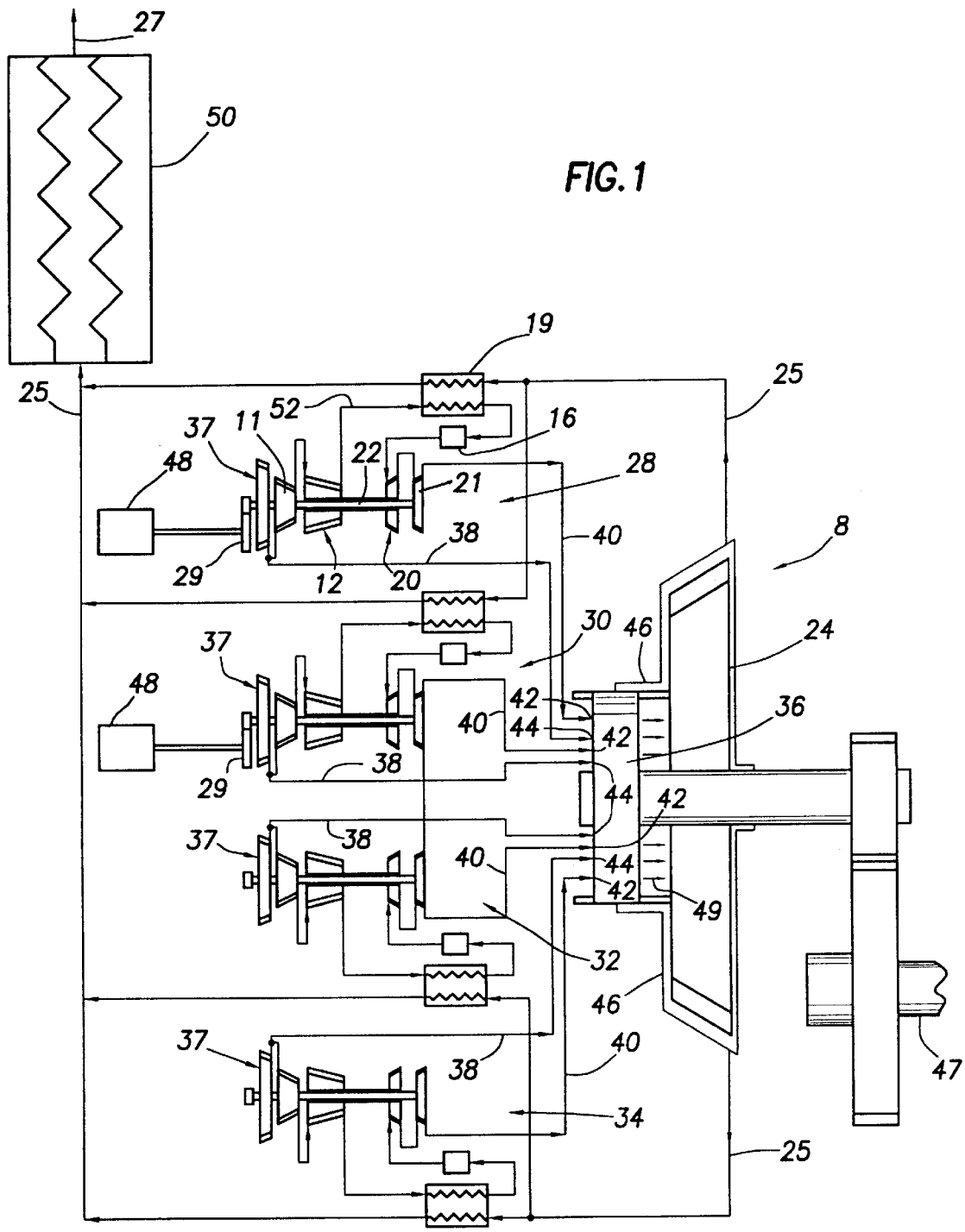
FIG. 1 is an operating schematic of the gas turbine engine of the present invention showing a plurality of gas generators providing hot and cool gas streams to a wave rotor convertor providing an intermediate temperature high pressure gas stream for driving a power turbine.
Figure 2:
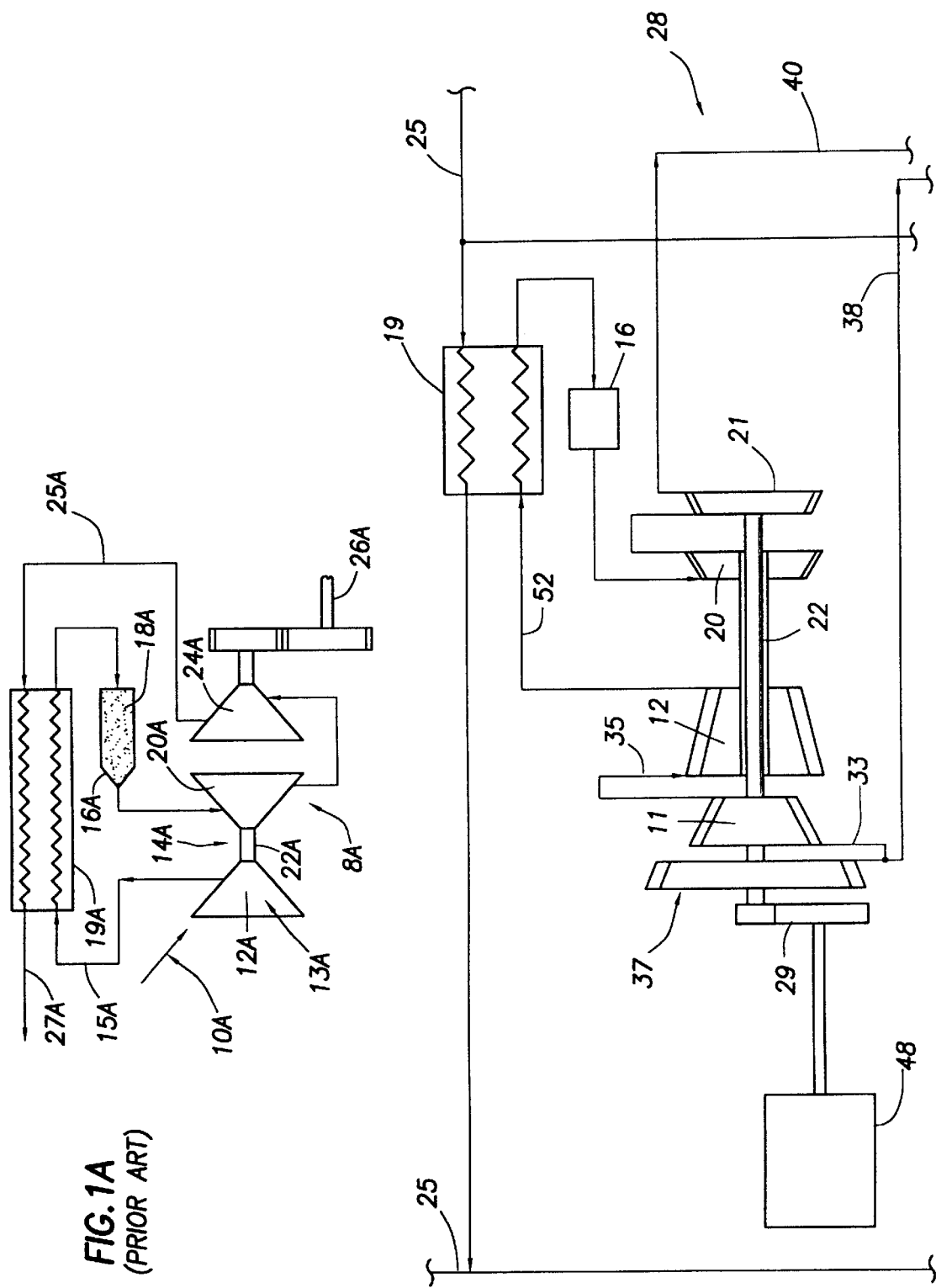
FIG. 2 is an enlarged view of a portion of the schematic of FIG. 2.

As shown in FIGS. 1 and 2, a gas turbine engine 8 of the marine propulsion system has a plurality of gas generators 28, 30, 32, 34 which generate hot and cool pressurized gas streams that are combined in a high efficiency topping cycle in a wave rotor convertor 36. The output of the wave rotor convertor 36 is a high-pressure gas stream at a temperature intermediate the input gas streams. This intermediate temperature, high-pressure gas is then supplied to a single, free power-turbine 24.

The preferred configuration of the gas turbine engine utilizes a plurality of standard aircraft-type bypass turbofan engines as gas generators 28, 30, 32, 34. A typical turbofan engine generates a first stream of high-pressure gas at a high first temperature, and a second stream of high-pressure gas at a second, lower temperature. Each gas generator 28, 30, 32, 34 is generally similar and for the purpose of illustration, only gas generator 28 will be explained although similar reference numerals are utilized for gas generators 30, 32, and 34. Gas generator 28 has a first stage compressor section 12 powered by a turbine 20 and connected by shaft 31. A turbofan section 37 is powered by an auxiliary turbine 21 working in combination with turbine 20 and connected by shaft 22 to a pre-compressor section 11 and a compressor section 12. An electric generator 48 may be connected by gearing 29 to the turbofan section 37 to generate electrical energy for various uses as may be desired.

Gas from turbofan section 37 passes through gas passaging or line 38 in a relatively cool low pressure gas stream and enters wave rotor connector 36 at inlet port 42. Some of the gas from turbofan section 37 also passes through line 33 to pre-compressor section 11 and through line 35 from pre-compressor section 11 to compressor section 12. Gas from compressor sections 11 and 12 passes to heat exchanger 19 and burner 16 through line 52. Gas passes from burner 16 in a high temperature high pressure stream to turbine 20 and auxiliary turbine 21. The high temperature high pressure gas stream from auxiliary turbine 21 passes through gas passaging shown by line 40 to wave rotor convertor 36 and enters wave rotor connecter 36 at inlet port 44.

Gas transport passaging comprising lines 38, 40 carry gas streams through inlet ports 42 and 44 to the input side of wave rotor convertor 36. A relatively cool, relatively low pressure gas stream is provided in line 38 from turbofan section 37, and a high pressure hot gas stream such as gas at about 2000 F. for example, may be provided in line 40. As the gasses flow through the wave rotor convertor 36, some of the energy from the hot gas is imparted to the cool gas so as to cause the cool gas pressure to be amplified, as a result of the well known pressure wave process which takes place in the wave rotor convertor 36. For further details of a wave rotor or wave rotor convertor, reference is made to aforementioned U.S. Pat. Nos. 4,719,746 and 5,297,384, the entire disclosure being incorporated herein for all purposes.

Each gas generator 28, 30, 32, 34 utilizes two inlet ports 42, 44 of the wave rotor convertor 36. Inlet ports 42 connected to high temperature gas passaging lines 40 are for the hot gas, and inlet ports 44 are connected to low temperature gas passaging or lines 38 for the relatively cool gas.

As an example, in the four gas generator system shown in FIGS. 1 and 2, the wave rotor convertor 36 has 8 inlet ports 42, 44. Due to the arrangement of ports 42, 44 on the wave rotor convertor 36, interaction among the turbine gas generators is minimized, and only minimum valving is necessary to provide isolation.

Upon exiting the wave rotor convertor 36, all the gas streams are combined into a third stream 49 of high pressure gas of a third temperature intermediate the high gas temperature of line 40 and the low gas temperature of line 38. Additional passaging for gas transport directs the third stream of gas 49 to the single, free power turbine 24 to provide mechanical energy to a shaft 47 for propulsion.

An additional heat recuperation generator 50 may be installed in exhaust passaging 25 to provide heat for steam generation, or other power sources. Exhaust passages 46 extend from wave rotor connector 36 and communicate with exhaust passaging 25 to heat recuperation generator 50.

Figure 3:
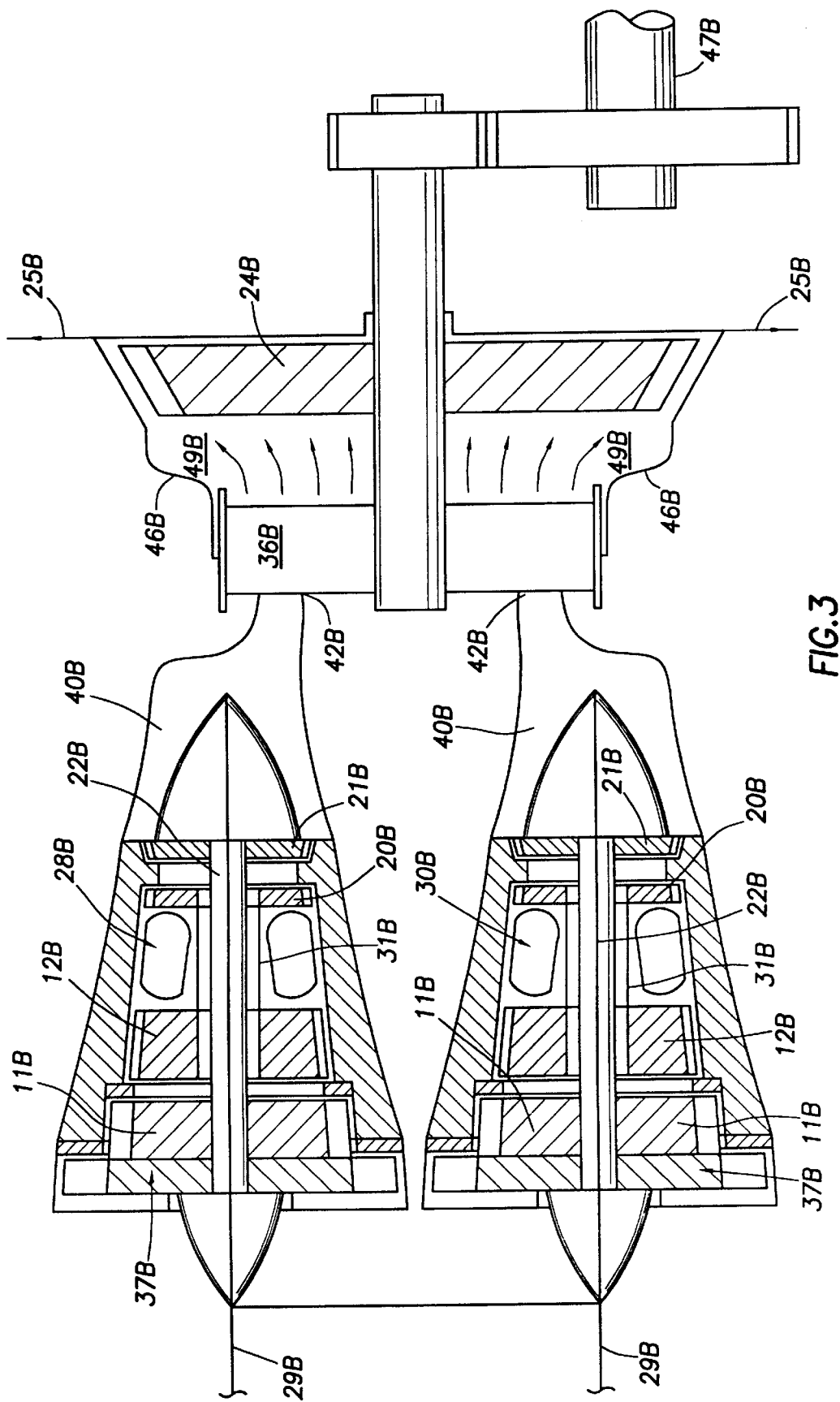
FIG. 3 is a modified schematic of the gas turbine engine of the present invention utilizing standard aircraft turbofan engines as the gas generators for providing hot and cool gas streams to a wave rotor convertor for driving a power turbine.

Aircraft Turbofan Engine—FIG. 3

Referring now to FIG. 3, a simplified schematic of a preferred configuration of the invention is shown. Two turbine gas generators 28B and 30B are shown arranged in a manner that may be suitable to mount a standard aircraft turbofan or turbojet engine. For example, each gas generator 28B, 30B could be a General Electric Aircraft Engine model F414-GE-400 turbofan engine, for example. This particular engine may be equipped with an afterburner section to provide bursts of power, albeit at lower fuel efficiencies, for emergency situations.

The turbofan engine or gas generator 28B, 30B is adapted to a gas passaging arrangement for providing gasses to wave rotor convertor 36B. Only the hot stream passaging 40B for inlet 42B to wave rotor convertor 36B is shown in FIG. 3. However, it is understood that passaging 38B would be connected to wave rotor convertor 36B for maintaining the cool gas streams separated from the hot gas streams. Turbofan engines 28B, 30B may have an electric generator such as shown in FIG. 1, mounted on the fan power takeoff 29B from turbofan section 37B to provide electrical power. When operated in the electrical power-generating mode, a portion of the energy normally supplied to the gas streams is diverted to the electric generator.

Each turbofan engine 28B, 30B has a turbine 20B, an auxiliary turbine 21B a first stage compressor section 12B, an auxiliary compressor section 11B and a turbofan section 37B. Shaft 22B connects auxiliary turbine 21B with compressor section 11B and turbofan section 37B. Shaft 31B connects compressor section 12B and turbine 20B.

As described earlier, the hot and cool gas streams are efficiently combined in the wave rotor convertor 36B and the resulting third gas stream 49B is transported to the free power turbine 24B for driving propulsion shaft 47B.

At any given time in operation, any number of gas generators may be in operation, according to the power needs. The engines forming the gas generators may be started and stopped as necessary to add to or subtract from the total power available, or simply to balance the operating time of the engines. When the vessel is underway, most of the power from the turbofan gas generators is directed to the power turbine for propulsion. Only a portion of the power would be diverted to cargo heating or electrical power generation.

There are often times of high electric power usage when the vessel is in port. During these times, the gas from the gas generators would normally be utilized for power generation, and the exhaust would be available for steam generation. In this operating mode, the wave rotor convertor and power turbine would be bypassed.

Because multiple high efficiency gas generators are utilized in this flexible power delivery arrangement, very high operating efficiencies are available under all the operating modes of the merchant vessel. As power demand increases, additional gas generators are put on-line. As demand decreases, they are taken off line. The ability to constantly adjust the power generated from a central source while maintaining very high fuel efficiencies allows for considerable savings in overall fuel costs for the operators of marine vessels.

Aircraft type turbofan engines suitable for the gas generators are readily available on the market at reasonable prices. When these engine are combined with the wave rotor convertor and the power turbine as described herein, the cost of the transportation propulsion system per installed horsepower is substantially lower as compared to diesel engines.

Although specific examples of this new gas turbine engine are shown herein, it would be appreciated by those experienced in the art that numerous modification to the specific designs disclosed are possible without departing from the spirit and scope of the invention. For example, more than one wave rotor convertor may be utilized to supply gas to the power-turbine, and many types of gas generators may be suitable for generating the hot and cool gas streams.

What is claimed is:

1. A gas turbine engine comprising:
   at least one gas generator and a power turbine arranged to drive a propulsion output shaft, said gas generator including coupled gas compressors and turbines;
   said gas generator generating a first stream of high pressure gas at a high temperature high pressure and a second stream of low pressure gas at a low temperature; and
   a wave rotor convertor between said gas generator and said power turbine receiving said first and second streams of gas from said gas generator, said wave rotor combining said first and second streams of gas into a third stream of high pressure gas of an intermediate temperature intermediate the temperatures of said first and second streams of gas;
   said third stream of gas being directed from said wave rotor convertor to said power turbine for driving said power turbine and propulsion output shaft.

2. The gas turbine engine as defined in claim 1 wherein a plurality of generally similar gas generators are provided and said wave rotor convertor receives the first and second streams of gas from each of said gas generators for combining into a third stream of high pressure gas of an intermediate temperature for driving said power turbine.

3. The gas turbine engine as defined in claim 2 wherein each of said plurality of generally similar gas generators is selectively operated dependent on the energy requirement for said gas turbine engine.

4. The gas turbine engine as defined in claim 1 wherein said gas generator comprises an aircraft turbofan engine.

5. The gas turbine engine as defined in claim 1 wherein a plurality of gas generators are provided and each of said gas generators comprises an aircraft turbofan engine.

6. The gas turbine engine as defined in claim 1 further comprising:
   a turbofan section for said gas generator coupled to said compressors; and
   an electric generator operatively connected to said turbofan section for selective operation of said electric generator.

7. The gas turbine engine as defined in claim 6 further comprising:
   gas passaging between said turbofan section and said wave rotor connector for supplying said second stream of low pressure gas to said wave rotor connector.

8. A gas turbine engine comprising:
   a plurality of gas generators for supplying high pressure high temperature gas to a power turbine arranged to drive a propulsion output shaft, each gas generator including coupled gas compressors and turbines;
   each of said gas generators generating a first stream of high pressure gas at a high temperature high pressure and a second stream of low pressure gas at a low temperature;
   said first and second streams of gas being combined into a third stream of high pressure gas of an intermediate temperature intermediate the temperatures of said first and second streams of gas; said third stream of gas being directed to said power turbine for driving said power turbine and propulsion output shaft; and
   each of said gas generators being selectively operated.

9. A gas turbine engine as defined in claim 8 further comprising:
   a turbofan section for each gas generator coupled to said gas compressors; and
   an electric generator operatively connected to said turbofan section for selective operation of electric generator.

10. A gas turbine engine as defined in claim 8 wherein each of said gas generators is selectively operated.

11. A gas turbine engine as defined in claim 8 wherein each of said gas generators comprises an aircraft turbofan engine.

* * * * *